Nov. 5, 1968 J. A. GREEFKES 3,409,743
SYSTEM FOR CHANGING SIGNAL DURATION WITH REPRODUCTION FREQUENCY COMPENSATION
Filed April 16, 1965
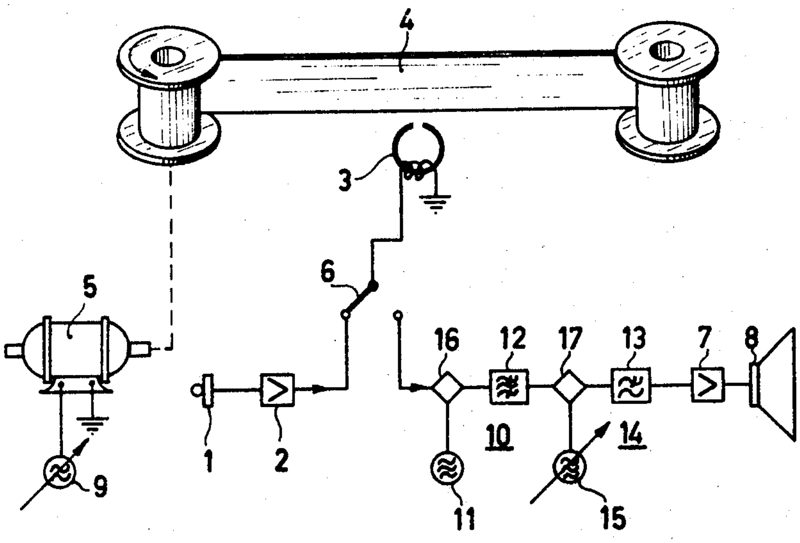
INVENTOR.
JOHANNES A GREEFKES
BY
Frank R. Trifari
AGENT 3,409,743

SYSTEM FOR CHANGING SIGNAL DURATION WITH REPRODUCTION FREQUENCY COMPENSATION

Johannes Anton Greefkes, Emmasingel, Eindhoven, Netherlands, assignor to North American Philips Company Inc., New York, N.Y., a corporation of Delaware Filed Apr. 16, 1965, Ser. No. 448,665
Claims priority, application Netherlands, Apr. 18, 1964, 6404265
6 Claims. (Cl. 179—100.2)

This invention relates to devices for reproducing speech signals comprising a device for recording signals on a moving carrier, for example, a record or a magnetic tape, and a device for reproducing the signals recorded on the carrier, wherein the speed of movement of the carrier is adjustable to different values for recording and reproducing.

Such reproducing devices are used inter alia for adjusting the length of a spoken text to a period of time fixed therefor, as in the case in broadcast programmes, for converting the spoken text in films from one tongue into another and the like. If, for example, it is desired to adjust the length of a spoken text from 22 minutes to a period of time of 20 minutes, this text is first recorded on a moving carrier and then reproduced by a reproducing device at increased speed of the carrier. By correct adjustment of the speed of the carrier for reproducing relative to that for recording, a spoken text may thus be given accurately the length of time set therefor. However, the quality and the natural fidelity of the speech signals reproduced are thus found to be detracted from, as is already distinctly perceptible with a difference of a few percent between the speeds of the carrier for recording and reproduction.

An object of the invention is to provide a reproducing device of the kind mentioned in the preamble in which, making allowance for the special character of speech signals, the speeds of the carrier for recording and reproduction can be varied within wide limits without involving any appreciable decline in quality of the speech signals reproduced.

A device according to the invention is characterized in that the reproducing device includes, in cascade with the recording device and the playback device, a single-sideband modulator and an associated modulation carrier oscillator, together with a subsequent single-sideband demodulator which demodulates the single sideband produced by a demodulation carrier wave which is shifted in frequency towards in the direction away from the single-sideband signal produced when the speed of the carrier for reproducing is increased or reduced respectively, with respect to that for recording.

In order that the invention may be readily carried into effect, it will now be described in detail, by way of example, with reference to the accompanying diagrammatic drawing.

In the reproducing device according to the invention as shown, the speech signals originating from a microphone 1, which are located, for example, in the band from 100 to 4000 c./s., subsequent to low-frequency amplification in a low-frequency amplifier 2, are recorded via a recording head 3 on a magnetic tape 4, which is driven by an electric motor 5 at a speed of 38 cm./sec.

In order to reproduce the speech signals recorded on the magnetic tape 4, the recording head 3 is changed-over by a switch 6 into a reproducing head, the signals thus picked-up being applied through a low-frequency amplifier 7 to a reproducing device 8, for example, a loud-speaker.

To reproduce the text recorded on the magnetic tape 4 within a given length of time, the speed of the electric motor 5, which drives the magnetic tape 4 during recording as well as during reproduction, is adjustable continuously. For this purpose the driving motor 5 is designed as an asynchronous alternating-current motor energized by an energizing oscillator 9 of adjustable frequency.

If a text located in the frequency band from 100 to 4000 c./s. and having a duration of 22 minutes, which has been recorded with a speed of tape of 38 cm./sec., is desired, for example, to be reproduced within a length of time of 20 minutes, the speed of tape for reproduction is increased to $22/20 \times 38$ cm./sec.$=41.8$ cm./sec. by adjusting the speed of the motor by means of the adjustable energizing oscillator 9. Each component of the speech spectrum is multiplied in frequency by a factor of 22/20, causing the speech signals reproduced being considerably influenced in quality and natural fidelity. In this case the band of the speech spectrum extends from $22/20 \times (100-4000)$ c./sec.$=110-4400$ c./s.

On the ground of extensive investigations about the character of speech signals, the decline in quality of reproduced speech signals caused by an increase in the speed of tape for reproduction is eliminated in a simple manner by providing the arrangement in cascade with the recording device and the play-back device, with a single-sideband modulator 10 and an associated modulation carrier oscillator 11 and a single-sideband filter 12, together with a single-sideband demodulator 14 including an output filter 13, which demodulates the single-sideband signal produced by a demodulation carrier provided by an adjustable local demodulation carrier oscillator 15, which demodulation carrier is shifted in frequency towards the single-sideband signal produced upon increasing the speed of tape for reproduction. The single-sideband modulator 10 and the single-sideband demodulator 14 includes push-pull modulators 16 and 17 respectively of the balanced modulator tape, the frequency of the modulation carrier oscillator being, for example, 20 kc./s.

In the specified numerical example the speech signals in the band, from 110 to 4400 c./s., which are reproduced by the head 3, are thus modulated on the carrier frequency of 20 kc./s. with suppression of the carrier wave in the ring modulator 16, the single-sideband filter 12 passing, for example, the upper sideband in the frequency band from 20.110 to 24.400 kc./s., which single-sideband signal is demodulated in the single-sideband demodulator 14 by a demodulation carrier which is shifted in frequency towards the single-sideband signal and is, for example, approximately 20.055 kc./s. A speech signal in the frequency band from 55 to 4345 c./s. thus appears at the output of the single-sideband demodulator 14 and this signal surprisingly makes substantially the same impression with regard to natural fidelity and quality as does the original speech signal in the band from 100 to 4000 c./s. In fact, the applicants have ascertained during the investigations that for the retaining natural fidelity and quality it suffices for speech signals that the displacement of the speech components in the first format range from 300 to 800 c./s. caused by varying the speed of tape during reproduction with respect to that for recording, is compensated substantially by shifting the frequency of the demodulation carrier. Thus, in the above-cited example, the recorded signals have been compensated so that signals of 550 c./s. (i.e. the center of the format range of 300 to 800 c./s.) are completely compensated. Conversely, if the speed of tape for reproduction is lower than that for recording, the retainment of natural fidelity and quality of the speech signals reproduced will require the frequency of the demodulation carrier to be shifted in the direction away from the single-sideband signal produced. For example, if the speed of the tape is decreased to change speech signals of the band 100–4000 c./s. to the band 90–3600 c./s., the single sideband signal will be in the band 20,090 c./s. to 23,600 c./s. When the sideband signal is demodulated with a demodulation carrier of 19,945 c./s., the reproduced speech signal will be in the band of 145 to 3655 c./s. In this case also input signals of 350 c./s., in the center of the first formant region, will be completely compensated.

The speeds of tape for recording and reproduction may be varied within wide limits, more particularly by several tens of percent, for example 20% without any appreciable decline in quality of the speech signals reproduced, which is more than sufficient for any use occurring in practice.

For the sake of completeness, it should be noted that the lower sideband instead of the upper sideband may be selected by the single-sideband filter 12, in which event the demodulation carrier is shifted in frequency in a similar manner as described hereinbefore, towards and in the direction away from the single-sideband signal produced upon increasing and reducing respectively the speed of the carrier for reproduction with respect of that for recording.

A characteristic fact is always that the reproducing device includes a single-sideband modulator 10 and a subsequent single-sideband demodulator 14 the demodulation carrier frequency of which is adjustable in a direction which depends on whether the speed of the carrier for reproducing is higher or lower than that for recording. The positions of the single-sideband modulator 10 and the single-sideband demodulator 14 are rather arbitrary; for example, in reproducing equipment having separate recording and reproducing heads the single-sideband modulator 10 and the single-sideband demodulator 14 may be included in the circuit of the recording head and in the circuit of the reproducing head respectively. The embodiment shown, in which both the single-sideband modulator and the single-sideband demodulator are included in the circuit of the reproducing device, affords the advantage that the modulator and demodulator may readily be incorporated in existing producing equipment.

What is claimed is:

1. A system for changing the time duration of a signal comprising a source of input signals, an output circuit, a series circuit comprising modulator means and demodulator means connected in that order between said source and output circuit, storage system means comprising information storage means for recording information signals on said storage means at a first predetermined rate, and means for reproducing information signals from said storage means at a second predetermined rate, and means for connecting said storage system means in series in said series circuit, said modulator means comprising a source of first oscillations and single sideband modulator means for modulating said signals with said first oscillations to produce a single sideband signal, said demodulator means comprising a source of second oscillations and mixing means for mixing said second oscillations with said single sideband signal to produce an output signal, the frequency of said second oscillations being shifted with respect to the frequency of said first oscillations whereby input signals of a predetermined frequency correspond to output signals of the same frequency.

2. The system of claim 1, in which said input signals are speech signals and said predetermined frequency is in the range of 300 to 800 cycles per second.

3. A system for changing the time duration of a signal comprising a source of input signals, an output circuit, a series circuit comprising modulator means and demodulator means connected in that order between said source and output circuit, storage means comprising information storage means and means for recording signals on said storage means and reproducing signals from said storage means at different rates, and means for connecting said storage system means in series in said series circuit, said modulator means comprising a source of first oscillations and single sideband modulator means for modulating said input signals with said first oscillations to produce a single sideband signal, said demodulator means comprising a source of second oscillations, and mixing means for mixing said single sideband signals with said second oscillations to produce an output signal, the frequency of said second oscillations being between the frequency of said first oscillations and the frequency of said single sideband signal corresponding to the lowest frequency, input signal when the rate of reproducing signals from said storage means is greater than the rate of recording signals, and being on the side of the frequency of said first oscillations away from said single sideband signals when the rate reproducing signals from said storage means is less then said rate of recording signals.

4. A system for changing the time duration of a signal comprising a source of input signals, an output circuit, a series circuit comprising modulator means and demodulator means connected in that order between said source and output circuit, and signals storage system means connected in said series circuit, said signal storage system means comprising a movable magnetic carrier, means for recording signals on said magnetic carrier and for reproducing signals from said carrier, and means for moving said carrier at different rates whereby signals are recorded on said carrier and reproduced from said carrier at different rates, said modulator means comprising a source of first oscillations, and single sideband modulator means for modulating said input signals on said first oscillations to produce a single sideband signal, said demodulator means comprising a source of second oscillations, and means for mixing said single sideband signals with said second oscillations to produce said output signal, the frequency of said second oscillations being shifted with respect to the frequency of said first oscillations whereby input signals of a predetermined frequency correspond to output signals of the same frequency.

5. The system of claim 4, wherein said signals storage system is connected between said source and said modulator means.

6. The system of claim 5, wherein said means for recording and reproducing comprises common recording and reproducing head means, comprising switch means for selectively connecting said head means to said source and said modulator means.

References Cited

UNITED STATES PATENTS

| | | | |
|---|---|---|---|
| 2,183,248 | 12/1939 | Riesz | 179—1.5 |
| 3,104,881 | 9/1963 | Ferris | 179—100.4 X |
| 3,230,306 | 1/1966 | Takayanagi | 179—100.2 X |

BERNARD KONICK, *Primary Examiner.*

R. F. CARDILLO, *Assistant Examiner.*